US012651387B2

(12) United States Patent
Foley et al.

(10) Patent No.: US 12,651,387 B2
(45) Date of Patent: Jun. 9, 2026

(54) SYSTEMS AND METHODS FOR MONOCULAR BASED OBJECT DETECTION

(71) Applicant: FORD GLOBAL TECHNOLOGIES, LLC, Dearborn, MI (US)

(72) Inventors: Sean Foley, Atlanta, GA (US); James Hays, Decatur, GA (US)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 18/054,585

(22) Filed: Nov. 11, 2022

(65) Prior Publication Data

US 2023/0063845 A1 Mar. 2, 2023

Related U.S. Application Data

(63) Continuation of application No. 17/105,199, filed on Nov. 25, 2020, now Pat. No. 11,527,028.

(51) Int. Cl.
| | |
|---|---|
| *G06T 11/60* | (2026.01) |
| *G01C 21/00* | (2006.01) |
| *G05D 1/00* | (2006.01) |
| *G06V 20/56* | (2022.01) |

(52) U.S. Cl.
CPC .......... *G06T 11/60* (2013.01); *G01C 21/3822* (2020.08); *G01C 21/3859* (2020.08); *G05D 1/0251* (2013.01); *G05D 1/0274* (2013.01); *G06V 20/56* (2022.01)

(58) Field of Classification Search
CPC . G06T 11/60; G01C 21/3859; G01C 21/3822; G06V 20/56; G05D 1/0251; G05D 1/0274

USPC .......................................................... 345/634
See application file for complete search history.

(56) References Cited

U.S. PATENT DOCUMENTS

| | | | |
|---|---|---|---|
| 10,410,328 B1 * | 9/2019 | Liu ......................... | G01C 21/32 |
| 2002/0049532 A1 | 4/2002 | Nakamura | |
| 2010/0217512 A1 | 8/2010 | Vu et al. | |
| 2019/0220002 A1 * | 7/2019 | Huang ...................... | G06T 7/70 |

(Continued)

FOREIGN PATENT DOCUMENTS

IN 202027039221 A 10/2020

OTHER PUBLICATIONS

International Preliminary Report on Patentability of PCT/US2021/057905 issued May 30, 2023, 5 pages.
(Continued)

*Primary Examiner* — Jin Ge
(74) *Attorney, Agent, or Firm* — Frank A. MacKenzie; Brooks Kushman P.C.

(57) ABSTRACT

Disclosed herein are systems, methods, and computer program products for object detection. The methods comprise performing the following operations by a computing device: obtaining an image that comprises a plurality of layers superimposed on each other; identifying a center point of a robot on a map; selecting a portion of the map contained in a geometric shape overlaid on the map so as to have a center set to the center point of the robot; obtaining map information associated with the selected portion of the map; generating at least one additional layer using the map information; superimposing the at least one additional layer onto the image to generate a modified image; and performing an object detection algorithm to detect at least one object in the modified image.

20 Claims, 11 Drawing Sheets

(56) References Cited

U.S. PATENT DOCUMENTS

2020/0132490 A1    4/2020  Yu
2021/0256849 A1    8/2021  Peranadam et al.

OTHER PUBLICATIONS

Chabot, F. et al., "Deep MANTA: A Coarse-to-fine Many-Task Network for joint 2D and 3D Vehicle Analysis from Monocular Image", (2017) arXiv:1703.07570v1 [cs.CV], available at https://arxiv.org/abs/1703.07570.

Chen, X. et al., "Monocular 3D Object Detection for Automous Driving", International Conference on Computer Vision and Pattern Recognition (CVPR), 2016, available at https://www.cs.toronto.edu/~urtasun/publications/chen_etal_cvpr16.pdf.

Kim, Y. et al., "Deep Learning Based Vehicle Position and Orientation Estimation via Inverse Perspective Mapping Image", 2019 IEEE Intelligent Vehicles Symposium (IV), available at https://ieeexplore.ieee.org/abstract/document/8814050 (Abstract).

Kundu, A. et al., "3D-RCNN: Instance-level 3D Object Reconstruction via Render-and-Compare", 2018 IEEE/CVF Conference on Computer Vision and Pattern Recognition, Salt Lake City, UT, 2018, pp. 3559-3568, available at https://openaccess.thecvf.com/content_cvpr_2018/papers/Kundu_3D-RCNN_Instance-Level_3D_CVPR_2018_paper.pdf.

Mousavian, A. et al., "3D Bounding Box Estimation Using Deep Learning and Geometry", (2017) 1612.00496v2 [cs.CV], available at https://arxiv.org/abs/1612.00496.

Roddick, T. et al., "Orthographic Feature Transform for Monocular 3D Object Detection", 1811.08188v1 [cs.CV] (2018), available at https://arxiv.org/pdf/1811.08188.pdf.

Srivastava, S. et al., "Learning 2D to 3D Lifting for Object Detection in 3D for Autonomous Vehicles", 1904.08494v2 [cs.CV] (2019), available at https://arxiv.org/abs/1904.08494.

Xu, B et al., "Multi-Level Fusion Based 3D Object Detection From Monocular Images", 2018 IEEE/CVF Conference pn Computer Vision and Pattern Recognition, Salt Lake City, UT, 2018, pp. 2345-2353, available at https://openaccess.thecvf.com/content_cvpr_2018/papers/Xu_Multi-Level_Fusion_Based_CVPR_2018_paper.pdf.

International Search Report and Written Opinion dated Dec. 27, 2021, issued in International Application No. PCT/2021/057905 (7 pages).

* cited by examiner

Method
400

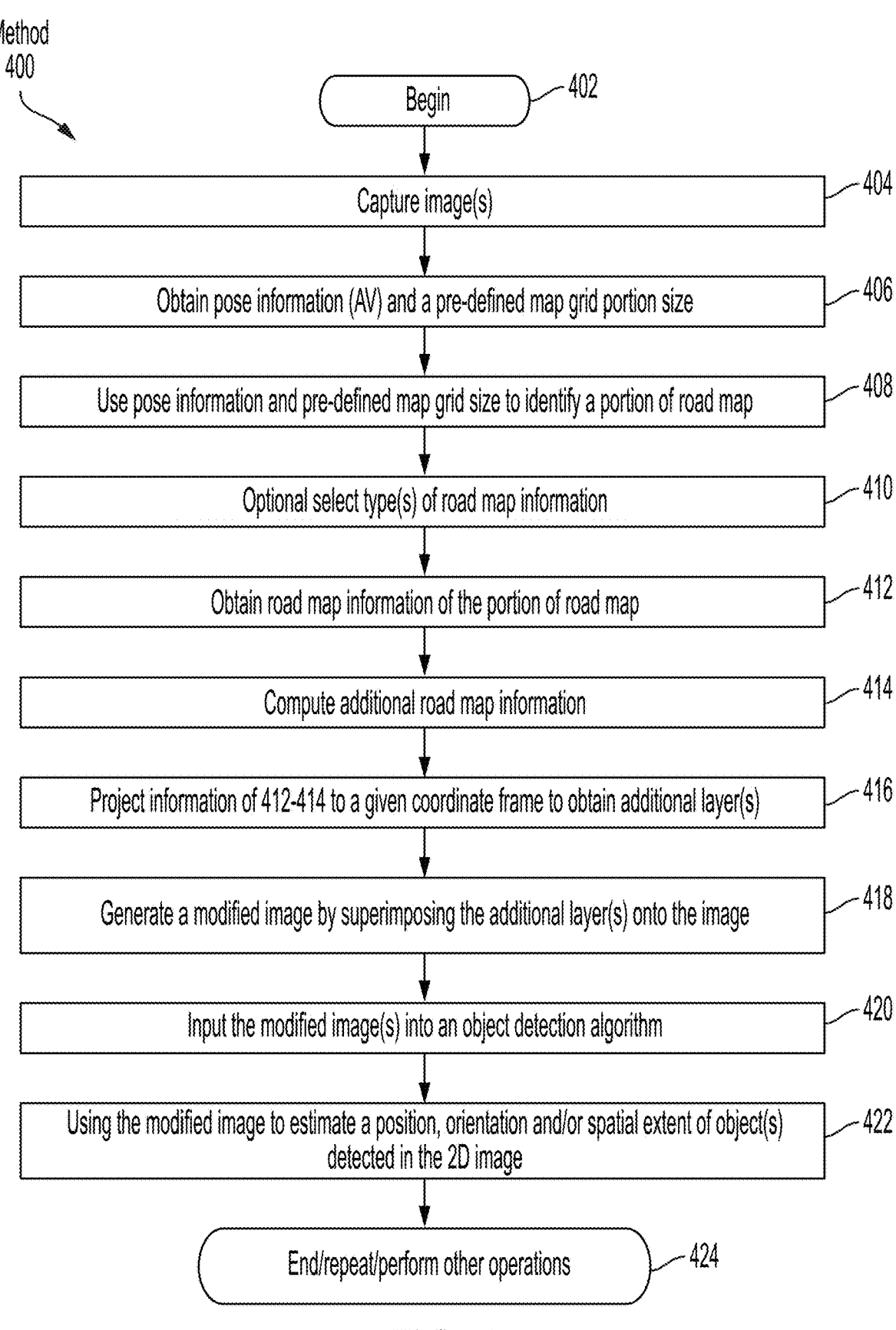

Begin — 402

Capture image(s) — 404

Obtain pose information (AV) and a pre-defined map grid portion size — 406

Use pose information and pre-defined map grid size to identify a portion of road map — 408

Optional select type(s) of road map information — 410

Obtain road map information of the portion of road map — 412

Compute additional road map information — 414

Project information of 412-414 to a given coordinate frame to obtain additional layer(s) — 416

Generate a modified image by superimposing the additional layer(s) onto the image — 418

Input the modified image(s) into an object detection algorithm — 420

Using the modified image to estimate a position, orientation and/or spatial extent of object(s) detected in the 2D image — 422

End/repeat/perform other operations — 424

FIG. 4

Road Map
500

900

1000

| Red Layer | ~1002 |
| Green Layer | ~1004 |
| Blue Layer | ~1006 |
| Ground Height Layer | ~1008 |
| Ground Depth Layer | ~1010 |
| Derivable Geographical Area Layer | ~1012 |
| Map Point Distance-To-Lane Center Layer | ~1014 |
| Lane Direction Layer | ~1016 |
| Intersection Layer | ~1018 |

SYSTEMS AND METHODS FOR MONOCULAR BASED OBJECT DETECTION

CROSS-REFERENCE TO RELATED APPLICATIONS

The present application is a continuation application of and claims priority to U.S. patent Ser. No. 17/105,199 which was filed on Nov. 25, 2019, now U.S. Pat. No. 11,527,028 issued on Dec. 13, 2022. The entire content of this application is incorporated herein by reference.

BACKGROUND

Statement of the Technical Field

The present disclosure relates generally to object detection systems. More particularly, the present disclosure relates to implementing systems and methods for monocular based object detection.

Description of the Related Art

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for identifying objects, tracking movements of the object, making predictions as to the objects trajectory, and planning paths of travel for the vehicle based on the predicted objects trajectory. LiDAR based object detection is costly and sensitive to weather conditions.

SUMMARY

The present disclosure concerns implementing systems and methods for object detection. The methods comprise performing the following operations by a computing device: obtaining an image that comprises a plurality of layers superimposed on each other; identifying a center point of a robot on a map; selecting a portion of the map contained in a geometric shape overlaid on the map so as to have a center set to the center point of the robot; obtaining map information associated with the selected portion of the map; generating at least one additional layer using the map information; superimposing the at least one additional layer onto the image to generate a modified image; and performing an object detection algorithm to detect at least one object in the modified image.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

The present solution will be described with reference to the following drawing figures, in which like numerals represent like items throughout the figures.

FIG. 4 provides a flow diagram of an illustrative method for object detection.

DETAILED DESCRIPTION

Figure 1:
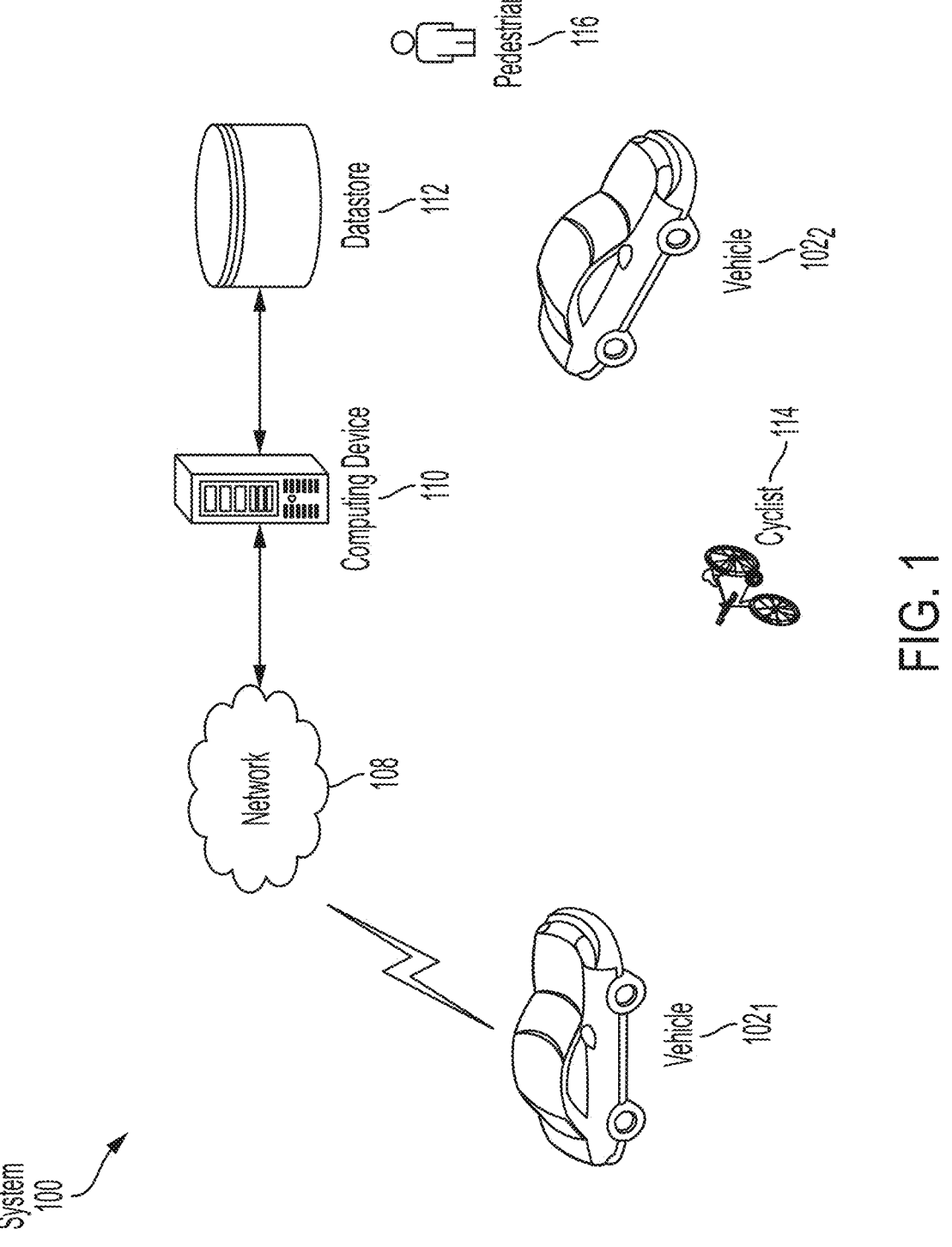
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present solution is described herein in the context of an autonomous vehicle. The present solution is not limited to autonomous vehicle applications. The present solution can be used in other applications such as robotic applications.

The present solution provides an alternative approach to LiDAR based object detection which is costly and sensitive to weather conditions. The present solution generally involves using an object detection algorithm that leverages information contained in a road map (e.g., a pre-defined high definition 3D surface road map) for monocular 3D object detection in, for example, AV applications. Road maps are well known in the art. Results of the object detection may be used for object trajectory prediction, vehicle trajectory generation, and/or collision avoidance. The object detection algorithm can include a machine-learning algorithm that is trained to estimate an object's position, orientation and/or spatial extent based on learned combination(s) of road map features. The road map features include, but are not limited to, a ground height feature, a ground depth feature, a drivable geographical area feature, a map point distance-to-lane center feature, a lane direction feature, and an intersection feature.

During operation, a monocular camera of the AV captures an image (e.g., a 2D image). The image comprises 3 layers (or channels) of information superimposed on each other—a Red (R) layer, a Green (G) layer and a Blue (B) layer. This image is also referred to as an RGB image. Road map information is projected onto the image. This projection is achieved by: obtaining AV pose information (a location defined as 3D map coordinates, an angle and a pointing direction of a vehicle to which the monocular camera is attached); using the AV pose information and a predefined map grid portion size to identify a portion of a road map to be projected into the image; and generating a modified image with superimposed road map information associated with the identified portion of the road map onto the image. The modified image is generated by adding additional layers (or channels) to the image. The additional layers (or channels) include, but are not limited to, a ground height layer (or channel), a ground depth layer (or channel), a drivable geographical area layer (or channel), a map point distance-to-lane center layer (or channel), lane direction layer (or channel), and/or an intersection layer (or channel). Pixels of the layers (or channel) are aligned with each other in 2D space. The modified image is then used by the object detection algorithm to estimate a positon, an orientation, a spatial extent, and/or a classification for at least one object detected in the modified image. The object's positon/orientation/spatial extent/classification is(are) then used to control operations of the AV (e.g., for object trajectory prediction, vehicle trajectory planning and/or vehicle motion control). Illustrative implementing systems of the present solution will now be described.

Illustrative Implementing Systems

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an AV. The AV $102_1$ can include, but is not limited to, a land vehicle (as shown in FIG. 1), an aircraft, or a watercraft.

AV $102_1$ is generally configured to detect objects $102_2$, 114, 116 in proximity thereto. The objects can include, but are not limited to, a vehicle $102_2$, a cyclist 114 (such as a rider of a bicycle, electric scooter, motorcycle, or the like) and/or a pedestrian 116. The object detection is achieved in accordance with a novel monocular based object detection process. The novel monocular based object detection process will be described in detail below. The monocular based object detection process can be performed at the AV $102_1$, at the remote computing device 110, or partially at both the AV $102_1$ and the remote computing device 110. Accordingly, information related to object detection may be communicated between the AV and a remote computing device 110 via a network 108 (e.g., the Internet, a cellular network and/or a radio network). The object detection related information may also be stored in a database 112.

When such an object detection is made, AV $102_1$ performs operations to: generate one or more possible object trajectories for the detected object; and analyze at least one of the generated possible object trajectories to determine whether or not there is an undesirable level of risk that a collision will occur between the AV and object if the AV is to follow a given trajectory. If not, the AV $102_1$ is caused to follow the given vehicle trajectory. If so, the AV $102_1$ is caused to (i) follow another vehicle trajectory with a relatively low risk of collision with the object or (ii) perform a maneuver to reduce the risk of collision with the object or avoid collision with the object (e.g., brakes and/or changes direction of travel).

Figure 2:
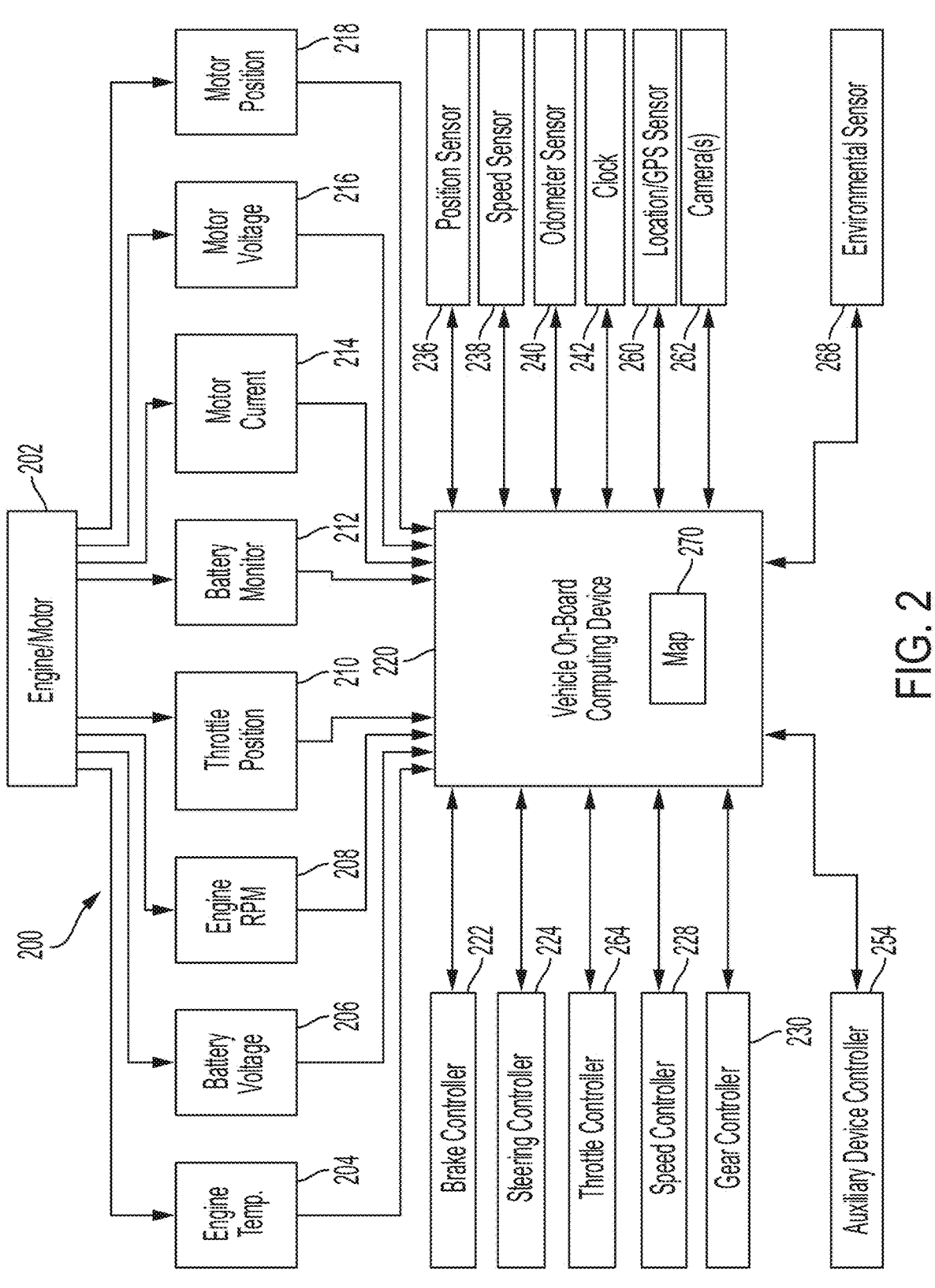
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); and object detection sensors such as one or more cameras 262. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals.

Captured images are communicated from the cameras 262 to the on-board computing device 220. The captured images are processed by the on-board computing device 220 to detect objects in proximity to the vehicle 200 in accordance with the novel monocular based object detection algorithm of the present solution. The novel monocular based object detection algorithm will be described in detail below. It should be noted that the monocular based object detection algorithm uses an object detection algorithm that leverages information contained in a road map 270 for object detection. The road map 270 can include, but is not limited to, any known or to be known 3D surface road map. The road map 270 is stored in a local memory of the on-board computing device 220.

The object detection algorithm can employ machine-learning. Machine-learning is a type of Artificial Intelligence (AI) that provides computers with the ability to learn without being explicitly programmed through the automation of analytical model building based on data analysis. In some scenarios, the machine-learning based object detection algorithm is configured to: recognize shapes of objects from various angles, relationships and trends from data; establish baseline profiles for objects based on the recognized information; and make predictions/estimations about object types, positions, orientations and spatial extents for objects detected in inputted images. The baseline profiles for objects may change over time. The machine-learning based object detection algorithm can employ supervised machine learning, semi-supervised machine learning, unsupervised machine learning, and/or reinforcement machine learning. Each of these listed types of machine-learning is well known in the art.

In some scenarios, the machine-learning based object detection algorithm includes, but is not limited to, a decision tree learning algorithm, an association rule learning algorithm, an artificial neural network learning algorithm, a deep learning algorithm, an inductive logic programming based algorithm, a support vector machine based algorithm, a clustering based algorithm, a Bayesian network based algorithm, a representation learning algorithm, a similarity and metric learning algorithm, a sparse dictionary learning algorithm, a genetic algorithm, a rule-based machine-learning algorithm, and/or a learning classifier systems based algorithm. The machine-learning process implemented by the present solution can be built using Commercial-Off-The-Shelf (COTS) tools (e.g., SAS available from SAS Institute Inc. of Cary, North Carolina).

When the on-board computing device 220 detects a moving object, the on-board computing device 220 will generate one or more possible object trajectories for the detected object, and analyze the possible object trajectories to assess the risk of a collision between the object and the AV if the AV was to follow a given vehicle trajectory. If the risk does not exceed the acceptable threshold, then the on-board computing device 220 may cause the vehicle 200 to follow the given trajectory. If the risk exceeds an acceptable threshold, the on-board computing device 220 performs operations to: (i) determine an alternative vehicle trajectory and analyze whether the collision can be avoided if the AV follows this alternative vehicle trajectory; or (ii) causes the AV to perform a maneuver (e.g., brake, accelerate, or swerve).

Figure 3:
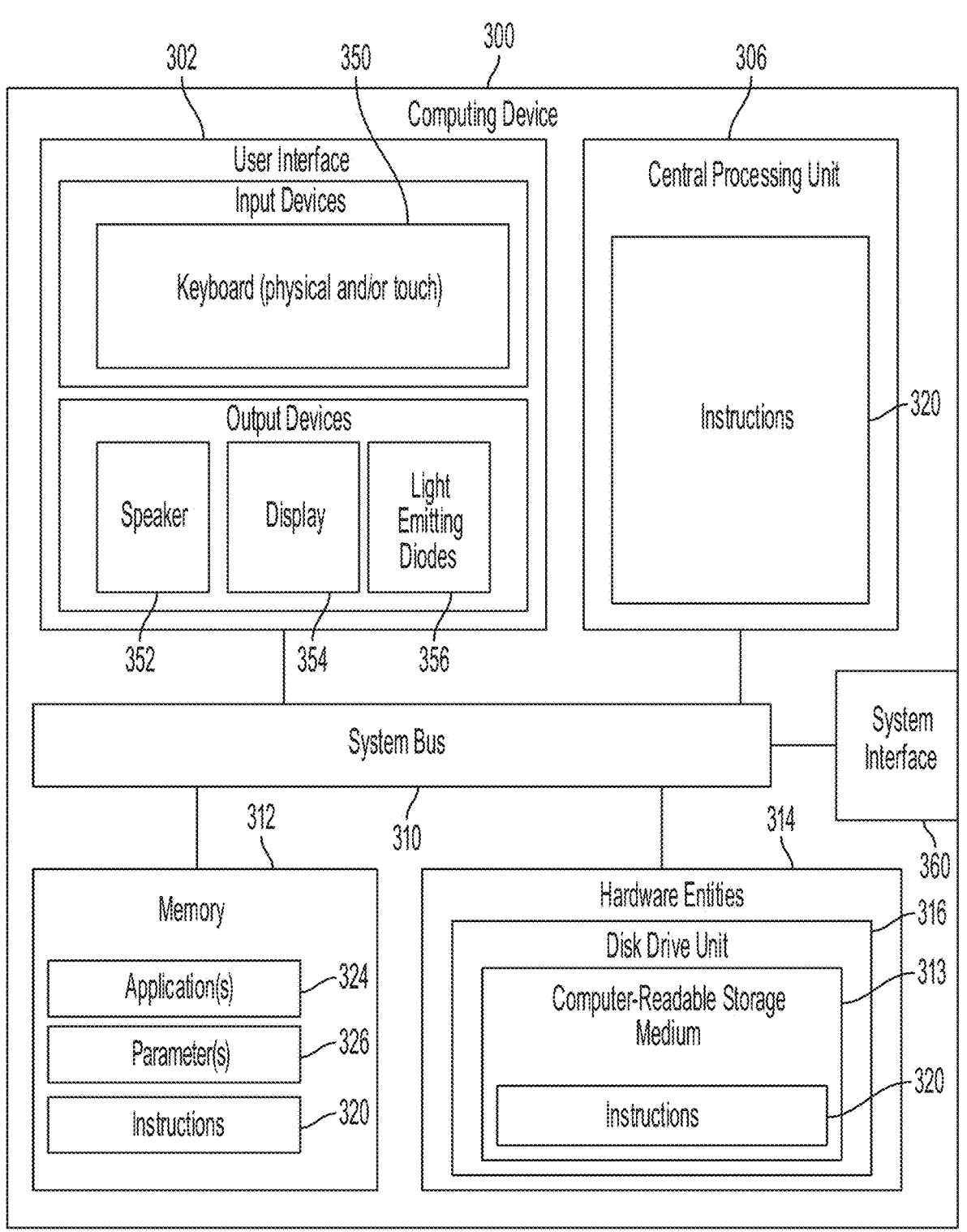
FIG. 3 is an illustration of an illustrative computing device.

Referring now to FIG. 3, there is provided an illustration of an illustrative architecture for a computing device 300. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 6:
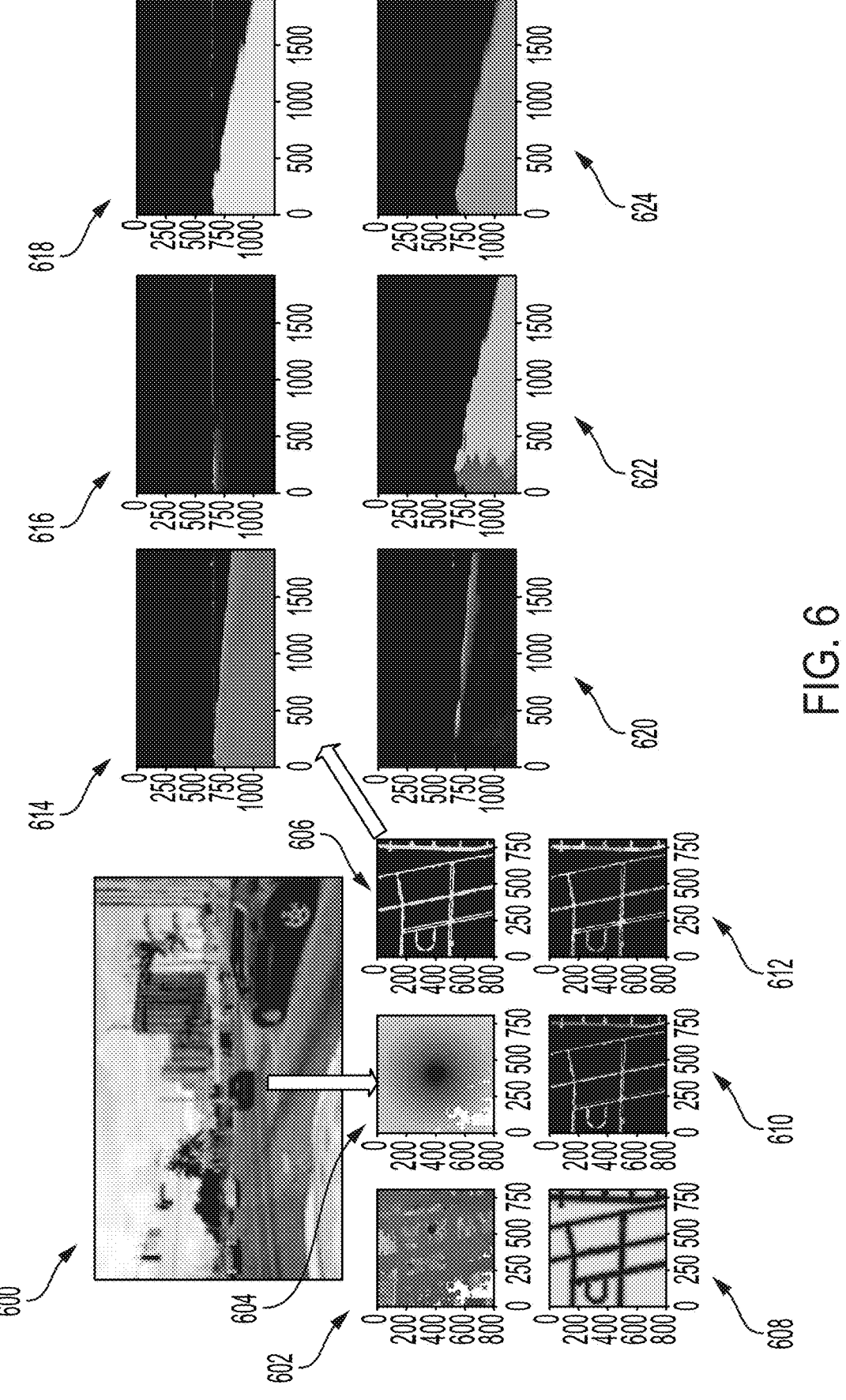
FIG. 6 provides images that are useful for understanding the method shown in FIG. 4.

Referring now to FIG. 4, there is provided a flow diagram of an illustrative method 400 for object detection. Method 400 begins with 402 and continues with 404 where one or more images are captured by a camera (e.g., camera 262 of FIG. 2). The camera may comprise a monocular camera mounted on an AV (e.g., AV 102₁ of FIG. 1) that captures images. Each image comprises 3 layers (or channels) of information superimposed on each other—a Red (R) layer, a Green (G) layer and a Blue (B) layer. This image is also referred to as an RGB image. An illustrative image 600 is shown in FIG. 6.

In 406, the computing device obtains pose information and a pre-defined map grid portion size (e.g., ≤200 meters by ≤200 meters) from a datastore (e.g., datastore 112 of FIG. 1 and/or memory 312 of FIG. 3). The pose information can include, but is not limited to, vehicle pose information. The vehicle pose information comprises a location of the vehicle defined as 3D map coordinates, an angle of the vehicle relative to a reference point, and a pointing direction of the vehicle.

Figure 5:
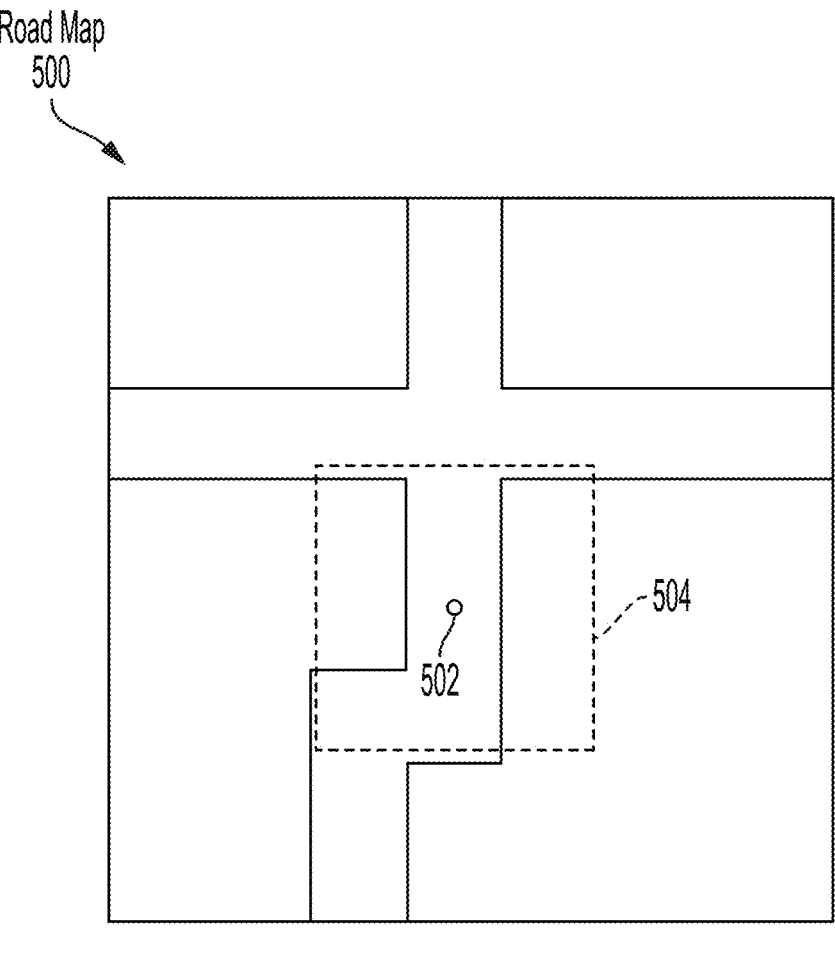
FIG. 5 provides an illustration of an illustrative road map.

The vehicle pose information and the pre-defined map grid portion size are used in 408 to identify a portion of the road map that is to be projected into the image captured in 404. The road map can include, but is not limited to, a 2.5D grid of a surface defined by data points each having an x-coordinate and a y-coordinate. The portion of the road map is identified by: identifying the center point of the AV on the road map; and selecting the portion of the road map that encompasses the AV, where the center of a shape (e.g., a rectangle) having the pre-defined map grid portion size is set to the center point of the AV. An illustration of an illustrative road map 500 is provided in FIG. 5. The center of the AV is represented by dot 502. The portion 504 of the road map is identified in 408 because it comprises a segment of the map that is included in a rectangle (i) having the same center point as the AV and (ii) dimensions (e.g., length and width) equal to those of the pre-defined map grid portion size. The present solution is not limited to the particulars of FIG. 5.

In optional 410, one or more types of road map information are selected by the computing device for use in generating a modified image. The types of road map information include, but are not limited to, ground, ground depth, drivable geographical area, map point distance-to-lane center, lane direction, intersection, and/or any other map information relevant to a given application. The type(s) of road map information is(are) selected based on machine-learned information. For example, the computing device machine learns that a combination of ground, ground depth and lane direction provides a most accurate solution in a first scenario, and machine learns that a different combination of ground and map point distance-to-lane center provide a most accurate solution in a second scenario. The present solution is not limited to the particulars of the example. In other scenarios, the type of road map information is pre-defined.

In 412, road map information is obtained for a plurality of geometric points p that are contained in the portion of the road map (identified in 408) from a datastore (e.g., datastore 112 of FIG. 1 and/or memory 312 of FIG. 3). This road map information includes, but is not limited to, ground information and drivable geographical area information. Illustrations of illustrative road map information obtained in 412 are provided in FIG. 6. The ground information obtained from a road map is shown plotted in an xy-coordinate system within graph 602. Each point of a ground surface is defined by a value having an x-coordinate and a y-coordinate. The drivable geographical area information is available as a binary value (derivable or non-) for each point in the grid. The drivable geographical area information obtained from a road map is shown plotted in an xy-coordinate system within graph 606. Each point of a drivable geographical area within the road map is defined by a value having an x-coordinate and a y-coordinate. Such ground information and drivable geographical area information is well known.

In 414, additional map information is computed by the computing device. The additional map information includes, but is not limited to, ground depth information, map point distance-to-lane center information, lane direction information, and/or intersection information. Ground depth information is derived from information contained in the road map and other information associated with a monocular camera. Thus, the ground depth information is derived from information stored in a datastore (e.g., datastore 112 of FIG. 1 and/or memory 312 of FIG. 3). This information includes, but is not limited to, ground height information, a known camera height, and/or a known camera location. Illustrative ground depth information is shown in graph 604 of FIG. 6. The ground depth information is computed using a Euclidean distance algorithm. Each Euclidean distance value represents a distance between a known location of a camera in 3-dimensional space and a given ground point location (i.e., defined by an x-coordinate and y-coordinate from the grid, and a z-coordinate from the ground height information). Each Euclidean distance value is defined by a single number defining a relation between two locations in 3-dimensional space, and thus is plotted in an xy-coordinate system on graph 604.

A map point distance-to-lane center value is computed by the computing device for each geometric point location (i.e., defined by an x-coordinate and y-coordinate) in the map. The nearest centerline to a map location is defined as whichever centerline of a plurality of centerlines contains the closest map point (in Euclidean distance in (x, y); vertical distance is ignored) to the map location. C is a set of centerlines, where c∈C consists of a set of geometric points p∈c. Distance is defined as the 2-norm. The nearest centerline ĉ to a map location l is defined by mathematical equation (1).

$$\hat{c} = \min_{c \in C}(\min_{p \in c}(\|p - l\|)) \qquad (1)$$

where p represents an ordered set of geometric points in the centerline. Illustrative map point distance-to-lane center value information is shown in graph 608 of FIG. 6. The value of the nearest centerline ĉ for each map location l is defined by an x-coordinate and a y-coordinate, and thus is plotted in an xy-coordinate system on graph 608.

A lane direction value is determined for each geometric point location l in the map. For example, a nearest centerline ĉ is identified for a given geometric point location 1. The direction of the geometric point location is then set to the lane direction defined for the nearest centerline. The lane direction is defined as a 2-vector with an x-component and y-component. Illustrative lane direction information is shown in graph 610 of FIG. 6. Each lane direction is plotted in an xy-coordinate system on graph 610.

An intersection value is determined for each geometric point location l in the map. For example, a nearest centerline ĉ is identified for a given geometric point location l. A determination is then made as to whether the nearest centerline is in an intersection contained in the map. This determination can be made based on a look-up table associated with the map or based on xyz-coordinates defining the nearest centerline and xyz-coordinates defining intersections within the map. If the xyz-coordinates of the nearest centerline fall within an area of an intersection, then a determination is made that the given geometric point location is in the intersection. As such, the intersection is assigned to the given geometric point location. Each intersection is defined by an x-component and y-component. Illustrative intersection information is shown in graph 612 of FIG. 6. Each intersection is plotted in an xy-coordinate system on graph 612.

Figure 7:
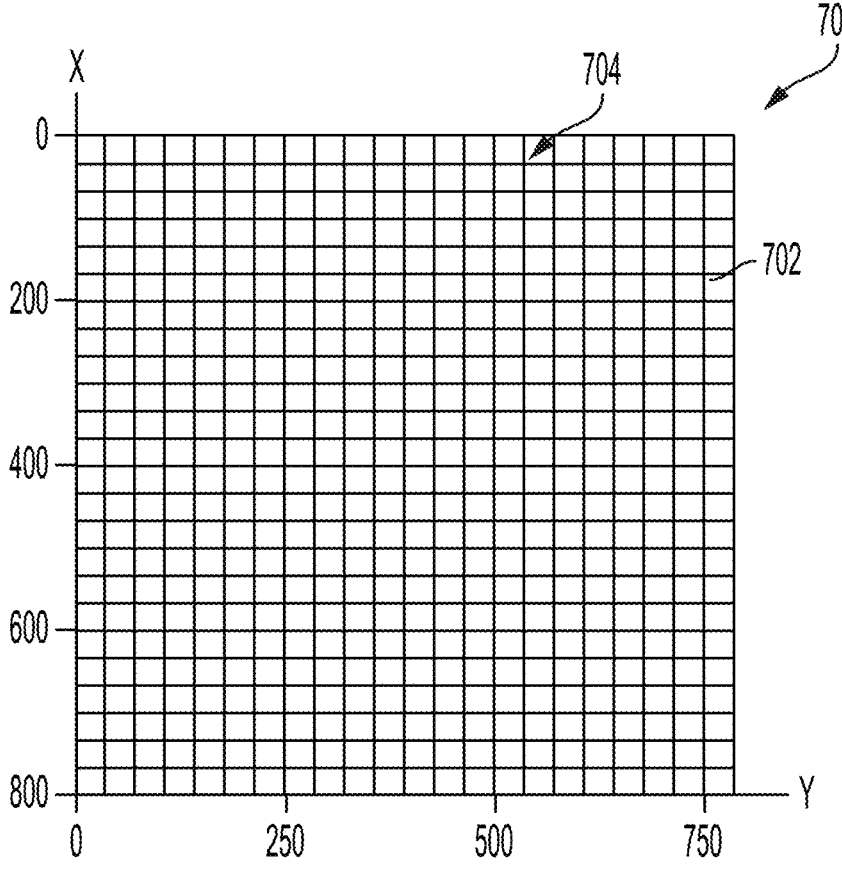
FIG. 7 provides an illustration of an illustrative grid.
Figure 8:
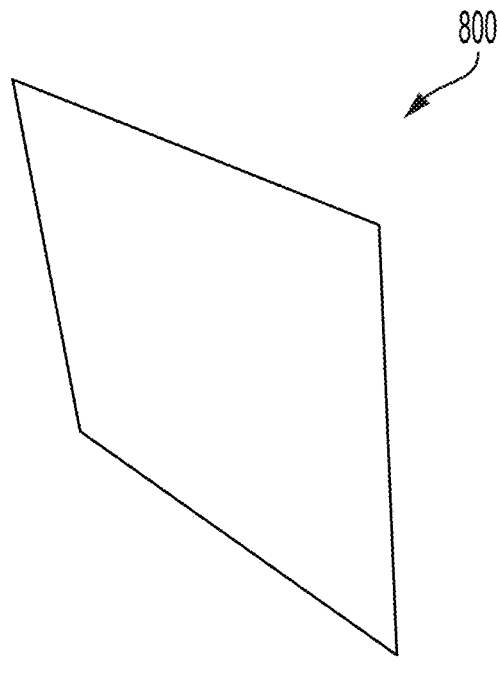
FIG. 8 provides an illustration of an illustrative polygon.

In 416, the map information of 412-414 is projected to a given coordinate frame to obtain additional layers (or channels). This projection is achieved by defining a grid on each graph (e.g., graphs 602-612). An illustrative grid 700 is shown in FIG. 7. The grid 700 comprises a plurality of tiles (or cells) 702. Each point 704 where two lines of the grid 700 meet (or intersect) defines a location of a geometric point of the map. Each tile (or cell) has four corners. Each corner is defined by a geometric point. Each geometric point location has a ground height value associated therewith. Each geometric point location has an identifier assigned thereto which is defined by a row number and a column number. For example, a first point has an identifier p11 since it resides in a first row and a first column. A second point has an identifier p12 since it resides in a the first row and the second column, etc. A last point has an identifier pmj since it resides in the m$_{th}$ row and the j$^{th}$ column. The present solution is not limited to the particulars of this example. The ground height values are used to define each tile (or cell) p11, . . . , pmj as a 4-polygon in 3D space. An illustrative 4-polygon 800 for a given tile (or cell) is shown in FIG. 8. The 4-polygons are then projected into a camera frame or view using a perspective transformation algorithm, i.e., is converted from an xyz-coordinate system to a uv-coordinate system. Perspective transformation algorithms are well known. Perspective transformation algorithms generally involve mapping the four points in plane A to four points in a plane B. This mapping involves transforming/converting x-coordinate values to u-coordinate values, and y-coordinate values to v-coordinate values. A color for each projected 4-polygon is set to a color value of a select point of the polygon or is set to an average of the color values for the points of the polygon. The polygons defined by the uv-coordinates are then drawn on the camera frame in a top-to-bottom manner relative to the v-axis.

Illustrations of illustrative additional layers (or channels) are provided in FIG. 6. Layer 614 comprises ground height information plotted in a uv-coordinate system. Layer (or channel) 616 comprises ground depth information plotted in a uv-coordinate system. Layer (or channel) 618 comprises derivable geographical area information plotted in a uv-coordinate system. Layer (or channel) 620 comprises map point distance-to-lane center information plotted in a uv-coordinate system. Layer (or channel) 622 comprises lane direction information plotted in a uv-coordinate system. Layer (or channel) 624 comprises intersection information plotted in a uv-coordinate system. The present solution is not limited to the particulars of FIG. 6.

Figure 9:
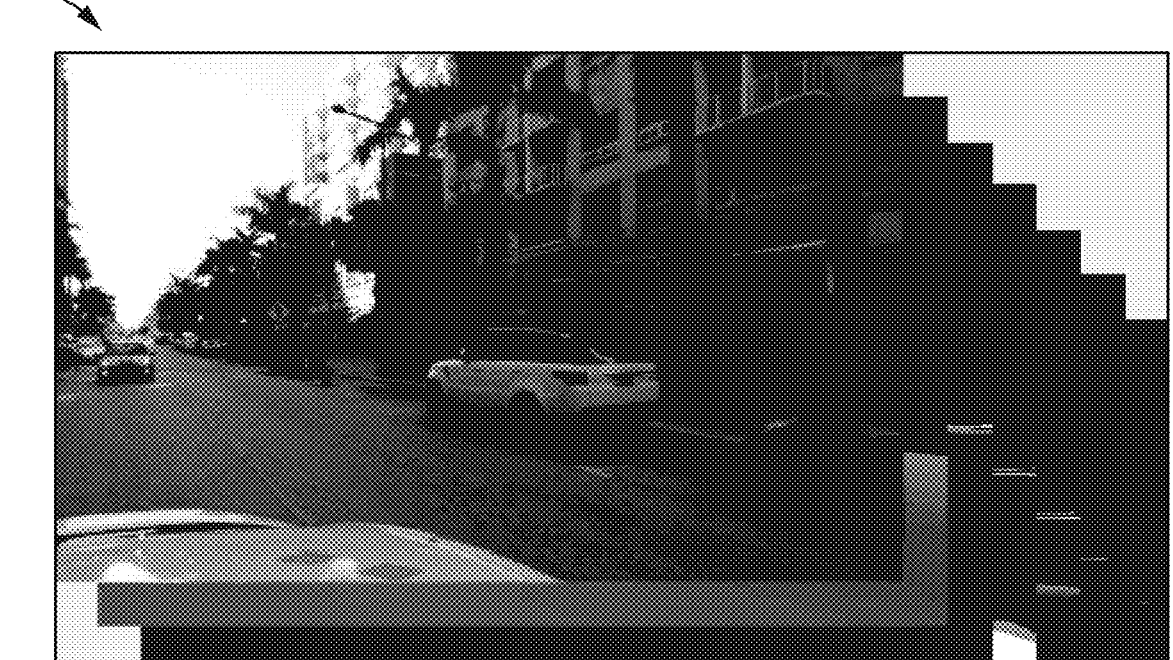
FIGS. 9-10 each provide an illustration of an illustrative modified image.
Figure 10:
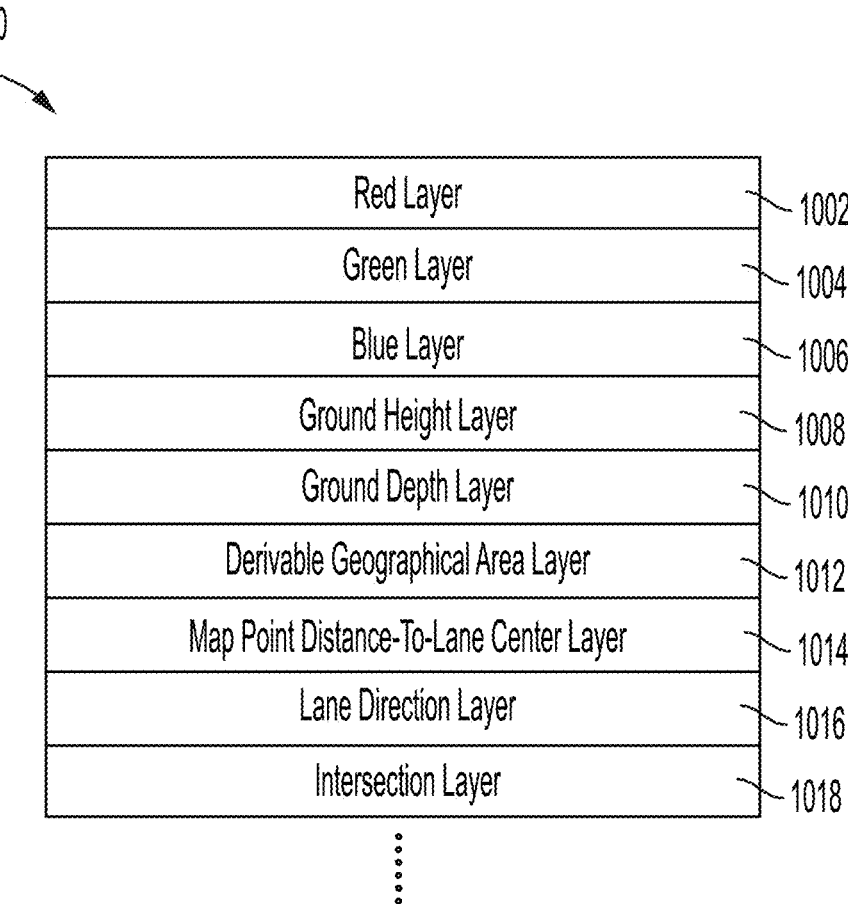

In 418 of FIG. 4, a modified image is generated by superimposing the additional layer(s) of road map information onto the image captured in 404. An illustration of an illustrative modified image 900 is provided in FIG. 9. Another illustrative modified image 1000 is provided in FIG. 10. As shown in FIG. 10, the modified image 1000 comprises an R layer (or channel) 1002, a G layer (or channel) 1004, a B layer (or channel) 1006, a ground height layer (or channel) 1008, a ground depth layer (or channel) 1010, a derivable geographical area layer (or channel) 1012, a map point distance-to-lane center layer (or channel) 1014, a lane direction layer (or channel) 1016, and an intersection layer (or channel) 1018. The present solution is not limited to the particulars of FIG. 10. The modified image can include more or less layers (or channels) of road map information than that show in FIGS. 9-10.

The modified image is input into an object detection algorithm of a computing device (e.g., computing device 110 of FIG. 1, vehicle on-board computing device 220 of FIG. 2, and/or computing device 300 of FIG. 3), as shown by 420. The object detection algorithm is generally configured to estimate a positon, an orientation, a spatial extent for at least one object detected in the modified image, and/or object classification, as shown by 422. In some scenarios, one of the following machine learning algorithms is employed in 422 for 3D object detection: a Deep MANTA algorithm, a 3D-RCNN algorithm, an RoI-10D algorithm, a Mono3D++ algorithm, MonoGRNet algorithm, or MonoGRNet V2 algorithm. Subsequently, 424 is performed where method 400 ends or other processing is performed (e.g., return to 402).

Figure 11:
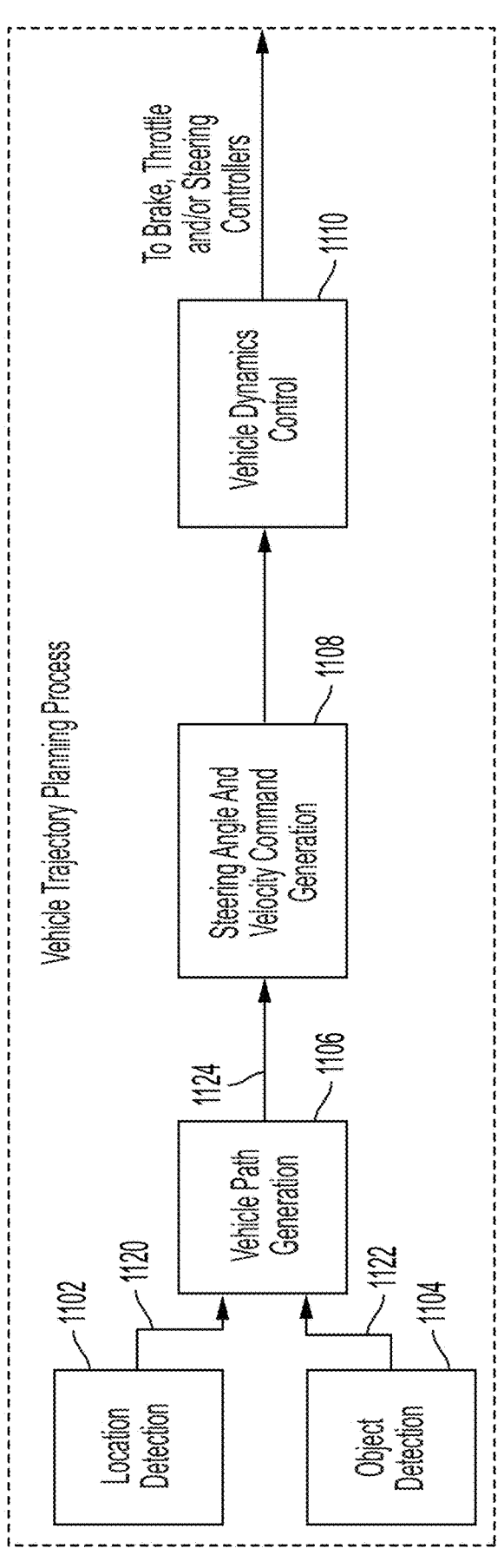
FIG. 11 provides a block diagram that is useful for understanding how a vehicle is controlled in accordance with the present solution.

The position, orientation, spatial extent and object classification generated during method 400 can be used by an AV for object trajectory prediction, vehicle trajectory generation, and/or collision avoidance. A block diagram is provided in FIG. 11 that is useful for understanding how vehicles control is achieved in accordance with the object related information estimated based on the modified image. All or some of the operations performed in FIG. 11 can be performed by the on-board computing device of a vehicle (e.g., AV 102₁ of FIG. 1) and/or a remote computing device (e.g., computing device 110 of FIG. 1).

In block 1102, a location of the vehicle is detected. This detection can be made based on sensor data output from a location sensor (e.g., location sensor 260 of FIG. 2) of the vehicle. This sensor data can include, but is not limited to, GPS data. Information 1120 specifying the detected location of the vehicle is then passed to block 1106.

In block 1104, an object is detected within proximity of the vehicle. This detection is made based on sensor data output from a camera (e.g., camera 262 of FIG. 2) of the vehicle. The manner in which the object detection is achieved was discussed above in relation to FIGS. 4-10. Information about the detected object 1122 is passed to block 1106. This information includes, but is not limited to a position of an object, an orientation of the object, a spatial extent of the object, an initial predicted trajectory of the object, a speed of the object, and/or a classification of the object. The initial predicted object trajectory can include, but is not limited to, a linear path pointing in the heading direction of the object.

In block 1106, a vehicle trajectory is generated using the information from blocks 1102 and 1104. Techniques for determining a vehicle trajectory are well known in the art. Any known or to be known technique for determining a vehicle trajectory can be used herein without limitation. For example, in some scenarios, such a technique involves determining a trajectory for the AV that would pass the object when the object is in front of the AV, the object has a heading direction that is aligned with the direction in which the AV is moving, and the object has a length that is greater than a threshold value. The present solution is not limited to the particulars of this scenario. The vehicle trajectory 1124 can be determined based on the location information 1120, the object detection information 1122, and/or a road map (e.g., road map 270 of FIG. 2 which is pre-stored in a datastore of the vehicle). The vehicle trajectory 1124 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 1124 is then provided to block 1108.

In block 1108, a steering angle and velocity command is generated based on the vehicle trajectory 1124. The steering angle and velocity command is provided to block 1110 for vehicle dynamics control.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for object detection, comprising:
   obtaining, by a computing device, an image that comprises a plurality of layers superimposed on each other;
   identifying, by the computing device, a center point of a robot on a map;
   selecting, by the computing device, a portion of the map contained in a geometric shape overlaid on the map so as to have a center set to the center point of the robot;
   obtaining, by the computing device, map information associated with the selected portion of the map;
   generating, by the computing device, at least one additional layer using the map information;
   superimposing, by the computing device, the at least one additional layer onto the image to generate a modified image; and
   performing, by the computing device, an object detection algorithm to detect at least one object in the modified image.

2. The method according to claim 1, further comprising causing, by the computing device, control operations of the robot based on an output of the object detection algorithm.

3. The method according to claim 1, wherein the identifying the center point of the robot is based on pose information of the robot that comprises a location defined in 3D map coordinates, an angle of the robot relative to a reference point, and a pointing direction of the robot.

4. The method according to claim 1, wherein the selected portion of the map represents a geographic area encompassing the robot.

5. The method according to claim 1, further comprising performing machine learning operations to select a first combination of different types of map information when a first scenario exists for the robot and a second combination of different types of map information when a second scenario exists for the robot.

6. The method according to claim 1, wherein the map information comprises at least one of ground information, drivable geographical area information, ground depth information, map point distance-to-lane center information, lane direction information, and intersection information.

7. The method according to claim 1, wherein the at least one additional layer comprises a ground height layer, a ground depth layer, a drivable geographical area layer, a map point distance-to-lane center layer, a lane direction layer, or an intersection layer.

8. The method according to claim 1, wherein the generating the at least one additional layer comprises:
   plotting the map information on a graph;
   defining a 2D grid on the graph, the 2D grid comprising a plurality of cells with each said cell having four corners respectively associated with geometric points of the map;
   using ground height values associated with the geometric points to define polygons in 3D space; and
   projecting the polygons into a camera frame.

9. The method according to claim 8, further comprising setting a color value of each said projected polygon to (i) a color value associated with a select one of the geometric points used to define a corresponding one of the polygons or (ii) an average color value for the geometric points used to define a corresponding one of the polygons.

10. The method according to claim 1, wherein at least two different additional layers are generated using the map information and superimposed onto the image to generate the modified image.

11. A system, comprising:
   a processor;
   a non-transitory computer-readable storage medium comprising programming instructions that are configured to cause the processor to implement a method for object detection, wherein the programming instructions comprise instructions to:
   obtain an image that comprises a plurality of layers superimposed on each other;
   identify a center point of a robot on a map;
   select a portion of the map contained in a geometric shape overlaid on the map so as to have a center set to the center point of the robot;
   obtain map information associated with the selected portion of the map;
   generate at least one additional layer using the map information;
   superimpose the at least one additional layer onto the image to generate a modified image; and perform an object detection algorithm to detect at least one object in the modified image.

12. The system according to claim 11, wherein the programming instructions comprise instructions to control operations of the robot based on an output of the object detection algorithm.

13. The system according to claim 11, wherein the center point of the robot is identified based on pose information of the robot that comprises a location defined in 3D map coordinates, an angle of the robot relative to a reference point, and a pointing direction of the robot.

14. The system according to claim 11, wherein the selected portion of the map represents a geographic area encompassing the robot.

15. The system according to claim 11, wherein the programming instructions comprise instructions to perform machine learning operations to select a first combination of different types of map information when a first scenario exists for the robot and a second combination of different types of map information when a second scenario exists for the robot.

16. The system according to claim 11, wherein the map information comprises at least one of ground information, drivable geographical area information, ground depth information, map point distance-to-lane center information, lane direction information, and intersection information.

17. The system according to claim 11, wherein the at least one additional layer comprises a ground height layer, a ground depth layer, a drivable geographical area layer, a map point distance-to-lane center layer, a lane direction layer, or an intersection layer.

18. The system according to claim 11, wherein the at least one additional layer is generated by:

plotting the map information on a graph;

defining a 2D grid on the graph, the 2D grid comprising a plurality of cells with each said cell having four corners respectively associated with geometric points of the map;

using ground height values associated with the geometric points to define polygons in 3D space; and projecting the polygons into a camera frame.

19. The system according to claim 18, wherein the programming instructions comprise instructions to set a color value of each said projected polygon to (i) a color value associated with a select one of the geometric points used to define a corresponding one of the polygons or (ii) an average color value for the geometric points used to define a corresponding one of the polygons.

20. A non-transitory computer-readable medium that stores instructions that are configured to, when executed by at least one computing device, cause the at least one computing device to perform operations comprising:

obtaining an image that comprises a plurality of layers superimposed on each other;

identifying a center point of a robot on a map;

selecting a portion of the map contained in a geometric shape overlaid on the map so as to have a center set to the center point of the robot;

obtaining map information associated with the selected portion of the map;

generating at least one additional layer using the map information, wherein the additional layer includes a drivable geographical area layer;

superimposing the at least one additional layer onto the image to generate a modified image such that a least a portion of a non-drivable geographical area is blocked in the modified image; and performing an object detection algorithm to detect at least one object in the modified image.

* * * * *